United States Patent [19]

Ennis et al.

[11] Patent Number: 4,600,227

[45] Date of Patent: Jul. 15, 1986

[54] HAND-HELD FILTER SEPARATING DEVICE

[76] Inventors: William H. Ennis, 3012 61st Ave. N., Brooklyn Center, Minn. 55429; Richard M. Ennis, 3107 Woodlawn Ave., Wayzata, Minn. 55391

[21] Appl. No.: 736,855

[22] Filed: May 22, 1985

[51] Int. Cl.$^4$ .................. B25J 15/00; B65H 3/20
[52] U.S. Cl. .................................................. 294/1.1
[58] Field of Search ............. 294/1.1, 86.4, DIG. 902; 15/104 A; 30/153; 221/210; 271/33

[56] References Cited

U.S. PATENT DOCUMENTS

| | | | |
|---|---|---|---|
| 517,295 | 3/1894 | Pulling | 294/1.1 X |
| 963,428 | 7/1910 | Feinenburg | 30/153 |
| 2,610,882 | 9/1952 | Sutliffe | 294/1.1 |
| 3,623,179 | 11/1971 | Roth | 15/104 A |
| 3,797,875 | 3/1974 | den Hamer | 294/1.1 |
| 3,864,993 | 2/1975 | Hovind | 294/1.1 X |
| 4,093,297 | 6/1978 | Reiber | 294/99.1 |
| 4,285,114 | 8/1981 | Underdahl | 294/1.1 X |

Primary Examiner—Johnny D. Cherry

[57] ABSTRACT

A hand-held filter separating device for separating a single coffee filter from a dish-shaped nested stack of filters such as those used in drip brewing coffee makers. The device eliminates the frustrating and time consuming act of trying to separate a single coffee filter by its edges using the fingers. The device is held in one hand and pressed against the surface of a filter with its adhesive surface exposed and withdrawn, easily separating that filter from the rest of the stack. Then it can simply be dropped inside the stack of filters after use because of its convenient size. The device is a combination of an adhesive portion, handle and a means of covering the adhesive portion, made up of two plastic injected pieces or even a less costly material, depending on the alternative used.

8 Claims, 9 Drawing Figures

HAND-HELD FILTER SEPARATING DEVICE

BACKGROUND OF THE INVENTION

This invention relates in general to devices used for the dispensing of single paper articles from a tightly nested stack of such articles, such as coffee filters used in drip brewing coffee machines.

Drip brewing coffee machines generally require the use of paper coffee filters which are very thin and are distributed in tightly compacted nested dish-shaped stacks, making the manual access to a single one of these filters very difficult, frustrating and time consuming. In addition to this difficulty, the consumer, many times, may actually be using two filters at a time which are stuck together and because of the thinness of the filters, goes unnoticed.

In an effort to overcome this difficulty, Reiber U.S. Pat. No. 4,093,297 discloses a grasping device which has a frame adapted to be held generally stationary with respect to the article being grasped and two manually operated tweezer legs with a stationary leg between the two moveable legs. These legs are capped on the ends with a rubber material by which to pinch the flat bottom of the inside filter of a nested stack against the stationary leg with one or both of the moveable legs, then the entire device along with the pinched filter is raised up out of the pack where the filter may be grasped. The device is also designed to fit atop the pack of filters through an opening in the top of the box which the filters are distributed in.

While Reiber's device provides gripping means, it is large, bulky, complex to use, and complex to manufacture in comparison with the present invention. It is also, therefore, more costly to manufacture and much more costly to the consumer. It is designed for use in conjunction with the box which the filters are distributed in and therefore requires more storage space. The grasping device requires coordinated finger pressure which must be maintained while the entire device is lifted to a height to which it clears the top of the filters and box to where the filter can be grasped, and then the device must be placed back into position. Additionally, if this maneuver were to take place inside a cupboard, substantial room above the box and device would be required.

The present invention eliminates all of the above complexities and requirements. It can be manufactured in high volume at a very fast rate and very low cost via plastic injection molding, thus low in cost to the consumer. It requires little or no assembly, since it consists of only one or two plastic injected pieces (depending on the alternative used) and is much more convenient and easy to use. As will become apparent in the description, there are alternatives which are even less costly to produce than the above mentioned mode of manufacture.

SUMMARY

It is an object of the present invention to provide a swift and effortless separation of a single coffee filter from its nested stack.

The present invention incorporates a drastically simplified method whereby the hand-held instrument exposes a sticky surface which is pressed against the surface of a filter in a stack of filters and withdrawn from the stack with that filter separated from the rest of the stack in an effortless procedure with no complex and bulky devices and eliminating the frustration and time consuming fumbling around with the fingers to separate just one filter by its edge and many times ending up with two filters stuck together anyway.

Furthermore, the present invention requires no additional storage space as it can simply be dropped inside the stack of filters which are sitting on a dish or in a shallow bowl or anywhere in the cupboard . . . wherever they are being kept. The box isn't even needed.

The filters may also be loosened from the stack several at a time for future use and this can be accomplished in a matter of seconds.

Other related objects and advantages of the present invention will be apparent from the following description.

DESCRIPTION OF THE PREFERED EMBODIMENT

Figure 1:
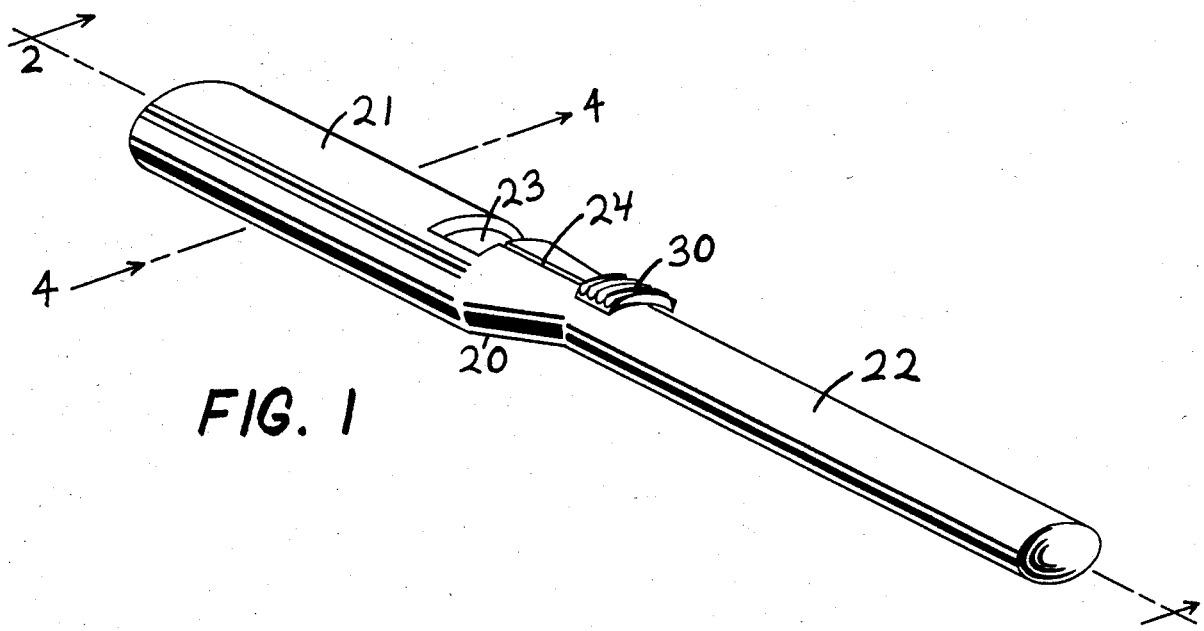
FIG. 1 is a perspective view of a hand-held filter separating device according to the embodiment of one form of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further application of the principles of the invention as illustrated therein being contemplated as would normally occur to one skilled in the art to which the invention relates.

Figure 5:
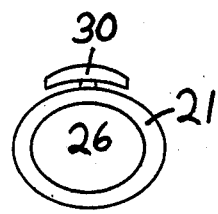
FIG. 5 is a view of the shape of the device from the front.
Figure 6:
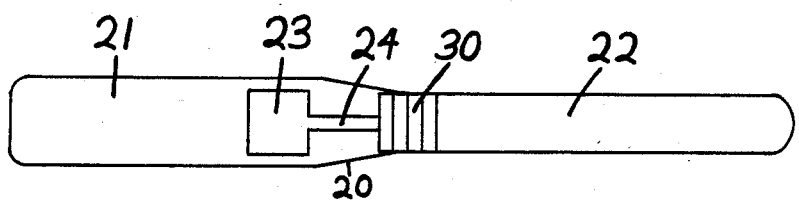
FIG. 6 is a view of the shape of the device from the top.

Referring to FIG. 1, there is illustrated one form of the handheld filter separating device showing a main piece 20 which is approximately five and one-quarter inches in actual length and is generally elliptical in shape as shown in FIG. 5.

Figure 2:
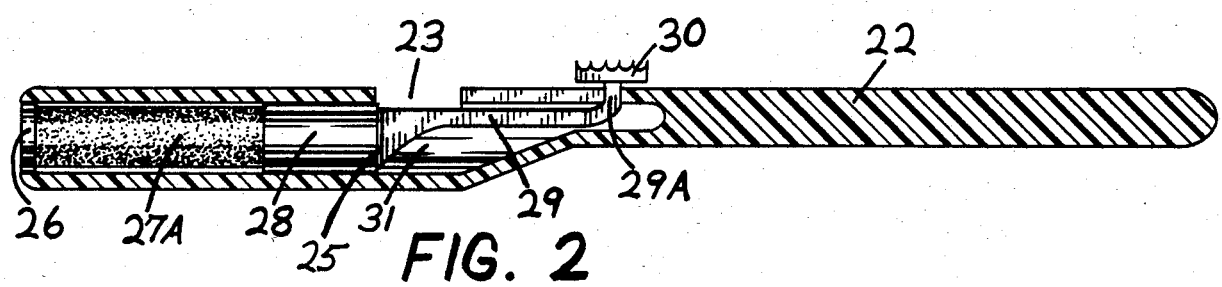
FIG. 2 is a section view taken along line 2—2 as indicated in FIG. 1.
Figure 3:
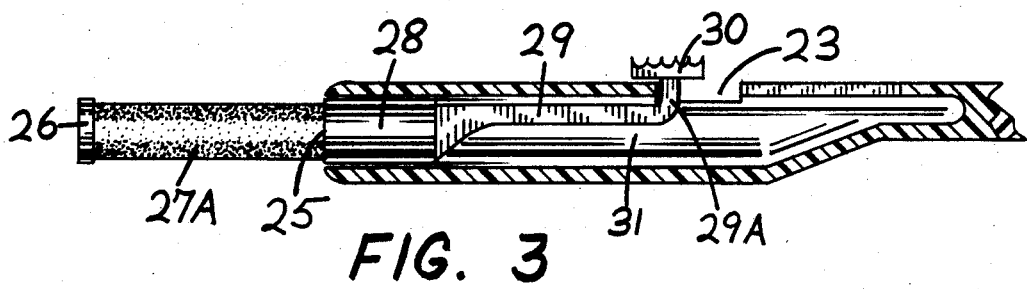
FIG. 3 is a partial section view taken from FIG. 2 showing the device in the open position.

Main piece 20 consists of a hand grip portion 22 and chamber housing portion 21 which act together as a means of support for cartridge 25, (see FIG. 2 and FIG. 3). Main piece 20 also consists of a window 23, slot track 24 and chamber 31, which in combination allow for insertion and removal of cartridge 25 as well as serving the function of assisting in the opening and closing of the device, and these functions will be described in more detail further on.

Main piece 20 is molded as one piece of rigid plastic material such as ABS plastic and produced by plastic injection molding.

Figure 4:
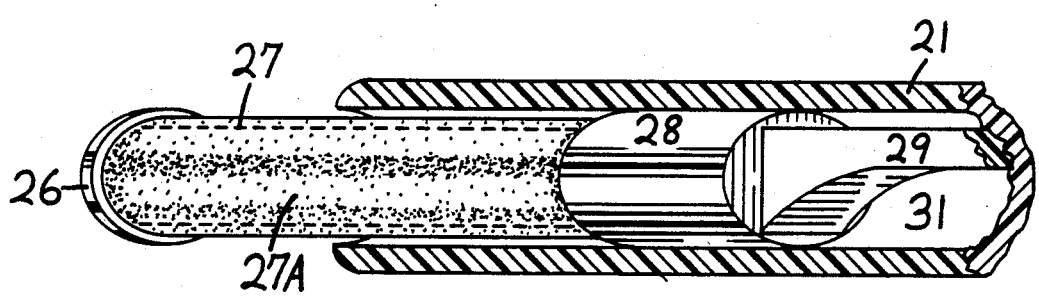
FIG. 4 is a partial section view taken along line 4—4 in FIG. 1 in perspective view.

Cartridge 25 consists of end cap 26, substrate 27, adhesive material 27A, piston 28, all of which conform to a generally elliptical shape (see FIG. 4), a shaft 29, stem 29A and knob 30. Cartridge 25 is also molded as one piece of plastic material, however, shaft 29 has a slightly resilient quality. Adhesive 27A is similar to that used in some forms of pressure sensitive tapes having tack strengths generally of about 0.01 to 0.05 pounds per inch of width, tested to stainless steel, and is applied to substrate 27 as a very thin film. Adhesive 27A is protected from any extraneous matter when the device is in closed position (see FIG. 2). The relationship of adhesive material 27A to substrate 27 is shown in FIG. 4 with the dash line indicating the underlying substrate 27.

Cartridge 25 is inserted into main piece 20 by placing knob 30 first into the open end of chamber 31. As piston 28 enters chamber 31 the knob end of shaft 29 must bend downward because of the height of chamber 31 and the relative height of knob 30. As cartridge 25 is pushed in further and knob 30 reaches the opening of window 23, knob 30 will spring up through window 23 due to shaft 29 returning to its natural position. Stem 29A is now aligned with slot track 24 along which it will travel when knob 30 is pushed forward by the thumb of one hand to open the device and backward to close it.

The top of knob 30 is contoured to conform to the top contour of chamber 31 as can be seen in FIG. 5 so that during insertion and removal of cartridge 25 there is minimal resistance. Cartridge 25 is so molded that with shaft 29 in its natural position with no stress being applied to it that the bottom surface of knob 30 is at rest just slightly above the top surface of main piece 20 when cartridge 25 is in place, as shown in FIG. 2, FIG. 3 and FIG. 5.

To remove cartridge 25, knob 30 is aligned with the opening of window 23 and pressed down through window 23 to where cartridge 25 may then be pulled out of chamber 31. This insertion and removal ability allows refill cartridges to be used with main piece 20. Note however, that one of these cartridges can last through several packages of 100 coffee filters when properly used.

Referring to FIG. 2, the device is shown in closed position where end cap 26 closes off the open end of chamber 31 while piston 28 closes off the rear end of chamber 31 and stem 29A is butted against the end of slot track 24.

The device is shown in open position in FIG. 3 with stem 29A butted against the forward wall of window 23 and substrate 27 is fully extended with piston 28 supporting it by the nature of its fit into chamber 31 of main piece 20.

The width and height of the ellipses of piston 28 and end cap 26 are the same and substrate 27 is narrower than the two allowing ample room between the walls of chamber 31 and the surface of adhesive material 27A. The length of piston 28 is equal to half the total length of substrate 27 thus reducing the possibility of excessive lateral movement in cartridge 25. Piston 28 is proportioned in close tolerance with chamber 31, creating a snug fit while allowing freedom of sliding motion.

Figure 7:
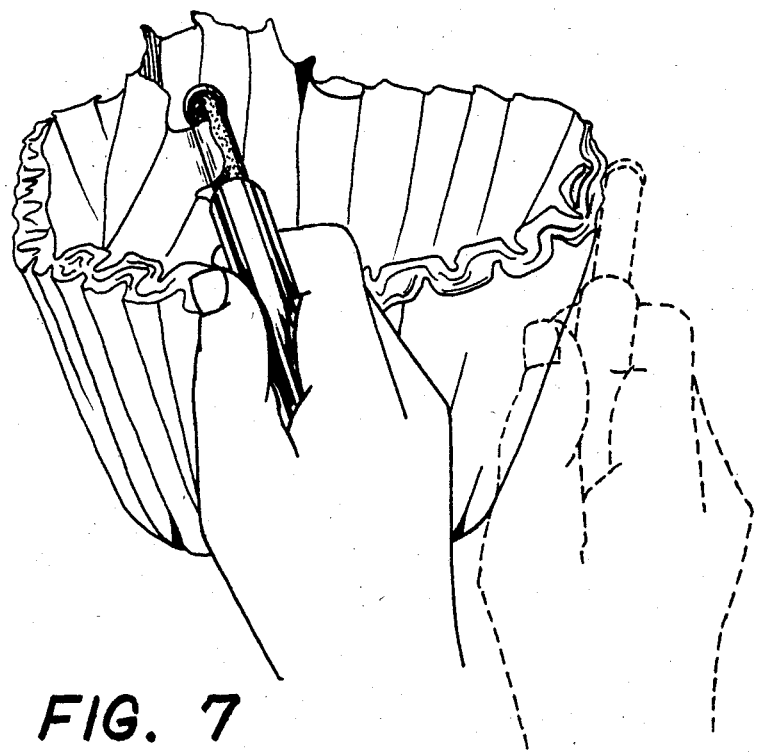
FIG. 7 is an illustration of the device in use, showing the device adhered to a filter from the inside portion of the stack of filters and a ghost image of removing a single filter from the outside portion of the stack.

FIG. 7 shows an example of the device in use. The device is held in one hand in such a way that the device can be easily opened with a slide of the thumb, the adhesive element is then pressed against the surface of a filter in the stack, this pressure being countered by the fingers of the other hand, then the device is withdrawn, exposing a single filter where it may be grasped and removed. This can be done from either the inside of the stack or the outside of the stack (as shown in FIG. 7), whichever is preferred by the consumer. If done from the inside of the stack, there is no need to pick up the stack of filters. If done from the outside of the stack, the stack can be held in one hand and the filter removed from the outside of the stack with the device in the other hand. After use, the device can simply be placed inside the stack of filters because of its convenient size.

Figure 8:
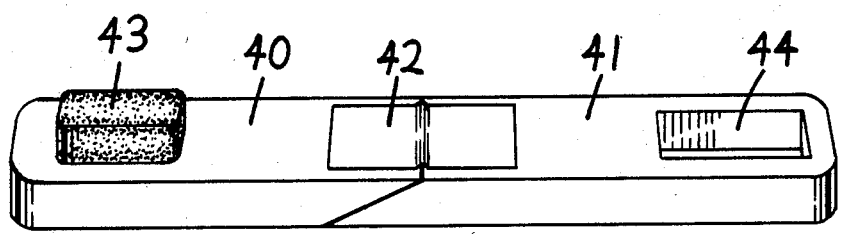
FIG. 8 is a perspective view of an alternative form of the invention shown in its open position.
Figure 9:
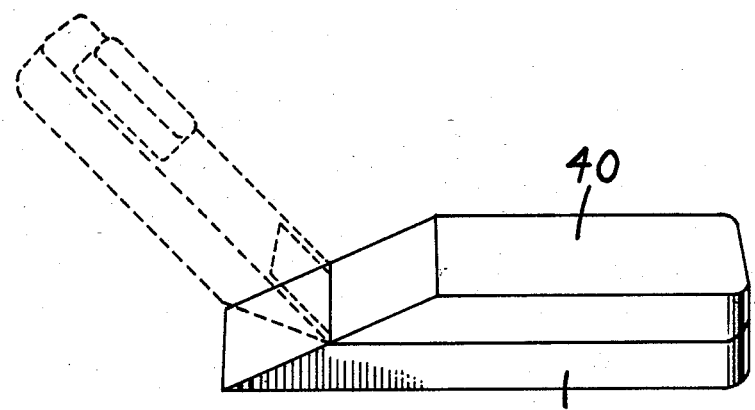
FIG. 9 is a view of the alternative form shown in FIG. 8 in closed position and a ghost image of one of its halves partially opening.

FIG. 8 shows an alternative form of the same invention. While there are many different ways of designing the same invention, the purpose for and manner in which the device is used remains the same and utilizes the same novel principles. The alternate form shown in FIG. 8 is even less costly to produce than the previously described device if made with two formed pieces of styrofoam, and when opened it forms itself into a handle as well. Again, means of support, means of handling and means of covering the adhesive element are combined into one form having all of these functions combined, and its operation is the same as the previously described device. This simpler form of device can also be made to be a more permanent type by forming it out of a plastic material and adapting it to receive refill adhesive elements.

The one half 40 supports the adhesive element 43 which is made up of a generally rectangular piece of styrofoam or similar material and has an adhesive material similar to that of the previously described device applied onto it. Element 43 can be fitted into a corresponding depression in half 40 or can be a raised portion formed as a part of half 40 itself. Half 41 is hinged to half 40 with a piece of adhesive tape 42, such as paper tape. Half 41 has a well 44 formed into it. Well 44 receives adhesive element 43 so that when the two halves 40 and 41 are closed together the walls of well 44 do not come into contact with any portion of adhesive element 43.

While the invention has been illustrated and described in detail in the drawings and the foregoing description, the same is to be considered as illustrative and not restrictive in character, it being understood that only the preferred embodiment has been shown and described and that all changes in design and modifications that come within the spirit of the invention are desired to be protected.

What is claimed is:

1. A device for overcoming the adherance of one paper coffee filter to another in a nested stack of paper coffee-filters thereby separating that one paper coffee-filter from the nested stack comprising:
   a substantially rigid hand-held piece having a hand grip portion and adjacent said hand grip portion a substrate portion having top and bottom surfaces with a layer of pressure sensitive adhesive covering about 0.05 to 0.75 square inches of surface area of both said top and bottom surfaces of said substrate portion, and having sufficient tack to overcome the adherance of one paper coffee-filter to another in a nested stack of paper coffee-filters while having sufficiently low tack that said one paper coffee-filter will not be torn as a result of removal from said adhesive.

2. The structure set forth in claim 1 wherein said grip portion and said substrate portion are hingedly connected to permit the adhesive material on said substrate portion to be swung into retracted protective position against said grip portion and to be swung into operative extended position remote from said grip portion.

3. The device of claim 1 where said rigid hand-held piece resists excessive flexibility when pressed to a filter in a stack and has overall dimensions which facilitate convenient placement inside said stack of paper coffee-filters.

4. The device of claim 1 where said substrate portion is a cartridge which is adapted to attach to said hand grip portion thereby allowing a cartridge with worn adhesive to be replaced with a cartridge having fresh adhesive thereon.

5. The structure set forth in claim 4 having a hollow chamber adjacent said grip portion for receiving said cartridge therein to provide protection for said pressure sensitive adhesive when said cartridge is in one position, but permitting said cartridge to be moved out of said hollow chamber into operative exposed position.

6. The structure set forth in claim 5 and a knob element attached to said cartridge for shifting the same into and out of said hollow chamber.

7. A method wherein a rigid hand-held piece having a hand grip portion and a substrate portion with a layer of pressure sensitive adhesive thereon is used to separate a single coffee filter from a nested stack of paper coffee-filters by grasping said hand grip portion and pressing said adhesive to the exposed surface of the outermost coffee-filter in a nested stack of coffee-filters and withdrawing said hand-held piece in combination with said filter which said adhesive has been pressed to, whereby the filter may be grasped and removed.

8. The method of claim 7, where a filter may be separated from either the outside or inside of said stack of paper coffee-filters.

* * * * *

UNITED STATES PATENT AND TRADEMARK OFFICE
CERTIFICATE OF CORRECTION

PATENT NO. : 4,600,227

DATED : July 15, 1986

INVENTOR(S) : William H. Ennis et al.

It is certified that error appears in the above-identified patent and that said Letters Patent is hereby corrected as shown below:

On the title page, Item /75/ "3012 61st Ave., N., Brooklyn Center, Minn. 55429" should read -- 18701 Stratford Road, Minnetonka, Mn 55345 --.

Signed and Sealed this

Twenty-eighth Day of October, 1986

[SEAL]

Attest:

DONALD J. QUIGG

Attesting Officer     Commissioner of Patents and Trademarks